United States Patent
Akimoto et al.

(10) Patent No.: US 12,533,703 B2
(45) Date of Patent: Jan. 27, 2026

(54) ELECTRODE MIXTURE SLURRY COATING DEVICE

(71) Applicant: Panasonic Intellectual Property Management Co., Ltd., Osaka (JP)

(72) Inventors: Yudai Akimoto, Osaka Fu (JP); Motoki Kinugawa, Kyoto Fu (JP); Takanori Maruo, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 440 days.

(21) Appl. No.: 18/036,046

(22) PCT Filed: Aug. 5, 2021

(86) PCT No.: PCT/JP2021/029085
§ 371 (c)(1),
(2) Date: May 9, 2023

(87) PCT Pub. No.: WO2022/102179
PCT Pub. Date: May 19, 2022

(65) Prior Publication Data
US 2023/0405630 A1 Dec. 21, 2023

(30) Foreign Application Priority Data
Nov. 11, 2020 (JP) ................. 2020-188213

(51) Int. Cl.
*B05C 5/02* (2006.01)
*H01M 4/04* (2006.01)
*H01M 4/525* (2010.01)

(52) U.S. Cl.
CPC ......... *B05C 5/0254* (2013.01); *H01M 4/0404* (2013.01); *H01M 4/525* (2013.01)

(58) Field of Classification Search
None
See application file for complete search history.

(56) References Cited

U.S. PATENT DOCUMENTS

| | | | | |
|---|---|---|---|---|
| 3,036,551 A | * | 5/1962 | Shreckhise | ......... B05C 11/1047 118/325 |
| 4,292,349 A | * | 9/1981 | Ishiwata | .................. G03C 1/74 118/410 |

(Continued)

FOREIGN PATENT DOCUMENTS

| CN | 109906527 A | 6/2019 |
|---|---|---|
| EP | 2149399 A1 | 2/2010 |

(Continued)

OTHER PUBLICATIONS

Extended (Supplementary) European Search Report dated Apr. 23, 2024, issued in counterpart EP Application No. 21891427.3. (8 pages).

(Continued)

*Primary Examiner* — Jethro M. Pence
(74) *Attorney, Agent, or Firm* — WHDA, LLP

(57) ABSTRACT

An electrode mixture slurry coating device includes: a transport roller that transports a band-shaped base material; and a die head provided at a position opposed to the transport roller, and that discharges and applies an electrode mixture slurry to the base material being transported. The die head includes a fluid reservoir in which the electrode mixture slurry accumulates, a discharge port for discharging the electrode mixture slurry, and a fluid path that provides communication between the fluid reservoir and the discharge port. At least a portion, being adjacent to the fluid path, of the die head is formed of a first material having a coefficient of linear expansion of 4.0 ppm/K or less, and $y < 2000/\sqrt{x}$ holds, where x [ppm/K] is the coefficient of (Continued)

linear expansion of the first material, and y [mm] is a length of the discharge port in a longitudinal direction of the die head.

7 Claims, 2 Drawing Sheets

(56) References Cited

U.S. PATENT DOCUMENTS

| | | | | |
|---|---|---|---|---|
| 5,118,525 | A * | 6/1992 | Chino | B05C 5/0254 427/284 |
| 5,167,712 | A * | 12/1992 | Shibata | G03C 1/74 118/410 |
| 5,203,922 | A * | 4/1993 | Shibata | B05C 5/0254 118/410 |
| 5,318,804 | A * | 6/1994 | Yoshida | G11B 5/848 118/409 |
| 5,418,004 | A * | 5/1995 | Chin | G11B 5/848 118/410 |
| 5,458,913 | A * | 10/1995 | Tsunoda | B05D 1/265 118/410 |
| 5,518,773 | A * | 5/1996 | Shibata | G03C 1/74 118/410 |
| 5,597,615 | A * | 1/1997 | Tsunoda | B05C 9/04 427/172 |
| 5,711,807 | A * | 1/1998 | Suzuki | G11B 5/848 |
| 6,436,190 | B1 * | 8/2002 | Akagi | B05C 5/0254 118/410 |
| 6,582,768 | B2 * | 6/2003 | Mandai | B05C 9/06 118/712 |
| 6,696,098 | B2 * | 2/2004 | Takekuma | B05C 5/0254 118/118 |
| 6,726,958 | B2 * | 4/2004 | Kawabe | B05C 9/06 118/410 |
| 6,733,589 | B2 * | 5/2004 | Tobisawa | B05C 5/0254 425/467 |
| 6,833,157 | B2 * | 12/2004 | Mandai | G03C 1/74 118/62 |
| 7,112,348 | B2 * | 9/2006 | Mandai | B05C 11/1039 118/410 |
| 7,208,201 | B2 * | 4/2007 | Kanke | B05C 5/007 118/410 |
| 7,255,896 | B2 * | 8/2007 | Kawabe | B05C 9/06 427/318 |
| 7,279,199 | B2 * | 10/2007 | Nojima | B41M 5/52 427/407.1 |
| 7,438,763 | B2 * | 10/2008 | Kanke | B05C 11/06 118/DIG. 2 |
| 7,690,326 | B2 * | 4/2010 | Wakai | H01M 4/8882 118/325 |
| 7,927,665 | B2 * | 4/2011 | Shibata | F16F 15/02 118/52 |
| 8,163,332 | B2 * | 4/2012 | Emoto | H01M 4/0409 118/244 |
| 8,267,039 | B2 * | 9/2012 | Ishizu | B05C 5/0254 118/679 |
| 8,574,365 | B2 * | 11/2013 | Wagner | B05C 11/1039 118/668 |
| 8,627,781 | B2 * | 1/2014 | Ishizu | B05C 11/1039 118/410 |
| 8,703,246 | B2 * | 4/2014 | Shibata | B05C 5/0254 118/325 |
| 8,733,275 | B2 * | 5/2014 | Nishimori | B05C 11/025 118/323 |
| 9,050,618 | B2 * | 6/2015 | Uematsu | B05C 5/0254 |
| 9,281,539 | B2 * | 3/2016 | Tsutsumi | H01M 50/209 |
| 10,468,662 | B2 * | 11/2019 | Hirai | H01M 10/058 |
| 10,493,485 | B2 * | 12/2019 | Hirai | B05C 5/0254 |
| 10,500,605 | B2 * | 12/2019 | Son | H01M 10/0585 |
| 10,835,917 | B2 * | 11/2020 | Yamane | B05C 5/0245 |
| 10,906,060 | B2 * | 2/2021 | Hirai | B05C 5/0258 |
| 10,933,438 | B2 * | 3/2021 | Hatanaka | B05C 13/00 |
| 11,161,140 | B2 * | 11/2021 | Lee | B05C 5/0283 |
| 11,378,728 | B2 * | 7/2022 | Ikeda | B05C 5/02 |
| 11,642,692 | B2 * | 5/2023 | Horinouchi | H01M 10/058 29/623.5 |
| 11,691,173 | B2 * | 7/2023 | Lee | B05C 11/1002 118/300 |
| 11,712,713 | B2 * | 8/2023 | Dodds | B05D 1/265 427/356 |
| 11,819,876 | B2 * | 11/2023 | Kim | B05C 1/0813 |
| 11,837,709 | B2 * | 12/2023 | Moon | H01M 4/139 |
| 11,850,627 | B2 * | 12/2023 | Horinouchi | B05C 5/027 |
| 11,964,298 | B2 * | 4/2024 | Seol | H01M 4/0404 |
| 12,115,554 | B2 * | 10/2024 | Kim | B05C 11/00 |
| 12,257,599 | B2 * | 3/2025 | Lee | H01M 4/0404 |
| 12,266,754 | B2 * | 4/2025 | Hirahara | H01M 4/04 |
| 12,280,394 | B2 * | 4/2025 | Horinouchi | B05D 1/34 |
| 12,287,191 | B2 * | 4/2025 | Sung | H01M 4/0404 |
| 12,406,976 | B2 * | 9/2025 | Hamaguchi | B41J 29/393 |
| 2003/0035897 | A1 * | 2/2003 | Takekuma | B05D 1/28 118/414 |
| 2004/0139913 | A1 * | 7/2004 | Kuromiya | B29C 48/31 118/668 |
| 2004/0175508 | A1 * | 9/2004 | Tanaka | G11B 5/848 |
| 2005/0019499 | A1 * | 1/2005 | Tomaru | G03C 1/74 118/123 |
| 2005/0126589 | A1 * | 6/2005 | Horie | B05C 5/0254 118/302 |
| 2005/0211164 | A1 | 9/2005 | Tokimasa et al. | |
| 2012/0204787 | A1 * | 8/2012 | Nakahata | H01M 4/0404 118/118 |
| 2013/0273253 | A1 * | 10/2013 | Kuniyasu | B05C 5/0254 118/123 |
| 2014/0308434 | A1 * | 10/2014 | Morishima | H01M 4/0404 427/58 |
| 2015/0266052 | A1 * | 9/2015 | Takagi | B05D 1/28 118/200 |
| 2015/0280226 | A1 * | 10/2015 | Teraki | H01M 4/0419 118/314 |
| 2018/0161803 | A1 * | 6/2018 | Kuniyasu | B05D 1/26 |
| 2018/0345310 | A1 * | 12/2018 | Watanabe | B05C 5/0208 |
| 2019/0214638 | A1 * | 7/2019 | Yokoyama | H01M 4/62 |
| 2020/0227719 | A1 | 7/2020 | Kim et al. | |
| 2021/0359294 | A1 * | 11/2021 | Kim | H01M 4/525 |
| 2022/0069272 | A1 * | 3/2022 | Mino | H01M 4/1397 |
| 2022/0158154 | A1 * | 5/2022 | Mimura | H01M 4/0435 |
| 2022/0297154 | A1 * | 9/2022 | Onishi | B05D 3/0406 |
| 2022/0344629 | A1 * | 10/2022 | Matsunaga | B05D 1/26 |
| 2022/0344632 | A1 * | 10/2022 | Kim | H01M 4/0435 |
| 2023/0048875 | A1 * | 2/2023 | Mino | B01F 27/051 |
| 2023/0053506 | A1 * | 2/2023 | Akimoto | B05C 5/02 |
| 2023/0118784 | A1 * | 4/2023 | Hong | H01M 4/0435 429/209 |
| 2023/0149969 | A1 * | 5/2023 | Rattray | B05C 1/0813 118/410 |
| 2023/0253539 | A1 * | 8/2023 | Lee | F26B 21/004 29/623.5 |
| 2023/0405630 | A1 * | 12/2023 | Akimoto | H01M 4/0404 |
| 2024/0024913 | A1 * | 1/2024 | Fukutomi | B05C 9/04 |
| 2024/0030454 | A1 * | 1/2024 | Mino | H01M 4/62 |
| 2024/0033772 | A1 * | 2/2024 | Kim | B05C 1/0813 |
| 2024/0058835 | A1 * | 2/2024 | Doyen | B05C 3/125 |
| 2024/0082871 | A1 * | 3/2024 | Urakami | B05C 5/0245 |
| 2024/0100562 | A1 * | 3/2024 | Ishiguro | B05D 1/36 |
| 2024/0105903 | A1 * | 3/2024 | Enokihara | H01M 4/139 |
| 2024/0105927 | A1 * | 3/2024 | Hirose | H01M 4/131 |
| 2024/0198380 | A1 * | 6/2024 | Onishi | H01M 4/139 |
| 2024/0226951 | A1 * | 7/2024 | Park | B05C 11/10 |
| 2024/0246110 | A1 * | 7/2024 | Cao | B05C 5/0254 |
| 2024/0250238 | A1 * | 7/2024 | Wang | H01M 4/139 |
| 2024/0250249 | A1 * | 7/2024 | Kim | B05C 5/0254 |
| 2024/0286168 | A1 * | 8/2024 | Suzuki | B05C 13/02 |
| 2024/0290934 | A1 * | 8/2024 | Koo | H01M 10/0431 |
| 2024/0299971 | A1 * | 9/2024 | Suzuki | H01L 21/6715 |
| 2024/0299972 | A1 * | 9/2024 | Kim | B05C 5/0254 |
| 2024/0399406 | A1 * | 12/2024 | Shida | B05C 5/02 |
| 2025/0054936 | A1 * | 2/2025 | Kim | H01M 4/139 |
| 2025/0125330 | A1 * | 4/2025 | Kim | H01M 4/623 |
| 2025/0178015 | A1 * | 6/2025 | Shida | B05D 1/28 |

(56) References Cited

U.S. PATENT DOCUMENTS

| | | | | |
|---|---|---|---|---|
| 2025/0178019 A1* | 6/2025 | Sasano | ................... | B05C 5/027 |
| 2025/0187034 A1* | 6/2025 | Shida | ................... | B05C 5/0254 |
| 2025/0196178 A1* | 6/2025 | Kim | ..................... | B05C 5/0245 |
| 2025/0205730 A1* | 6/2025 | Maeda | ................. | B05C 5/0254 |
| 2025/0242376 A1* | 7/2025 | Sohn | ................... | H01M 4/0411 |
| 2025/0262639 A1* | 8/2025 | Kim | ................... | H01M 4/0404 |

FOREIGN PATENT DOCUMENTS

| | | |
|---|---|---|
| JP | 2004-066016 A | 3/2004 |
| JP | 2016-131941 A | 7/2016 |
| JP | 2017-042758 A | 3/2017 |
| JP | 2018-49787 A | 3/2018 |
| JP | 2018-122283 A | 8/2018 |
| JP | 2020-113382 A | 7/2020 |

OTHER PUBLICATIONS

International Search Report dated Oct. 19, 2021, issued in counterpart International Application No. PCT/JP2021/029085, with English translation. (5 pages).

Office Action dated Jun. 12, 2025, issued in counterpart CN Application No. 202180075098.5, with Partial English translation. (8 pages).

Office Action dated Aug. 19, 2025, issued in counterpart JP Application No. 2022-561275, with English translation. (6 pages).

* cited by examiner

ELECTRODE MIXTURE SLURRY COATING DEVICE

CROSS-REFERENCE TO RELATED APPLICATIONS

This application is a National Phase Application filed under 35 U.S.C. § 371 of International Application No. PCT/JP2021/029085 filed on Aug. 5, 2021, which claims the benefit of priorities under 35 U.S.C. § 119 (a) of Japanese Patent Application No. 2020-188213 filed in Japan on Nov. 11, 2020, the contents of which are incorporated herein by reference.

TECHNICAL FIELD

The present disclosure relates to an electrode mixture slurry coating device for use in a manufacturing process of secondary battery electrodes.

BACKGROUND ART

Conventionally, a coating device including a die head for applying a coating liquid to an object to be coated is known (e.g., PTL 1). In the coating device according to PTL 1, the main body of the die head is composed of a first ceramic sintered body, and a distal end portion of the die head is composed of a second ceramic sintered body having higher fracture toughness than the first ceramic sintered body. This makes it possible to obtain a die head that is relatively light-weight and has a less amount of impurities mixed into the coating liquid.

CITATION LIST

Patent Literature

PTL 1: Japanese Laid-Open Patent Publication No. 2017-042758

SUMMARY OF INVENTION

Technical Problem

It is conceivable to use a coating device including a die head to apply an electrode mixture slurry of a secondary battery electrode. Such a usage requires to make the application thickness of the slurry as uniform as possible. The reason for this is that a significant variation in the application thickness results in a reduce yield. In particular, in the field of high-capacity secondary batteries for which it is required to minimize the manufacturing tolerance, it is important to suppress the variation in the application thickness. Under such a circumstance, the present disclosure is to improve the yield in manufacture of secondary batteries.

An aspect according to the present disclosure relates an electrode mixture slurry coating device. The coating device includes: a transport roller that transports a band-shaped base material; and a die head that is provided at a position opposed to the transport roller, and that discharges and applies an electrode mixture slurry to the base material being transported, wherein the die head includes a fluid reservoir in which the electrode mixture slurry accumulates, a discharge port for discharging the electrode mixture slurry, and a fluid path that provides communication between the fluid reservoir and the discharge port, at least a portion, being adjacent to the fluid path, of the die head is formed of a first material having a coefficient of linear expansion of 4.0 ppm/K or less, and $y < 2000/\sqrt{x}$ holds, where x [ppm/K] is the coefficient of linear expansion of the first material, and y [mm] is a length of the discharge port in a longitudinal direction of the die head.

According to the present disclosure, it is possible to suppress the variation in the application thickness of an electrode mixture slurry of a secondary battery electrode, thus improving the yield in manufacture of secondary batteries.

DESCRIPTION OF EMBODIMENT

Figure 1:
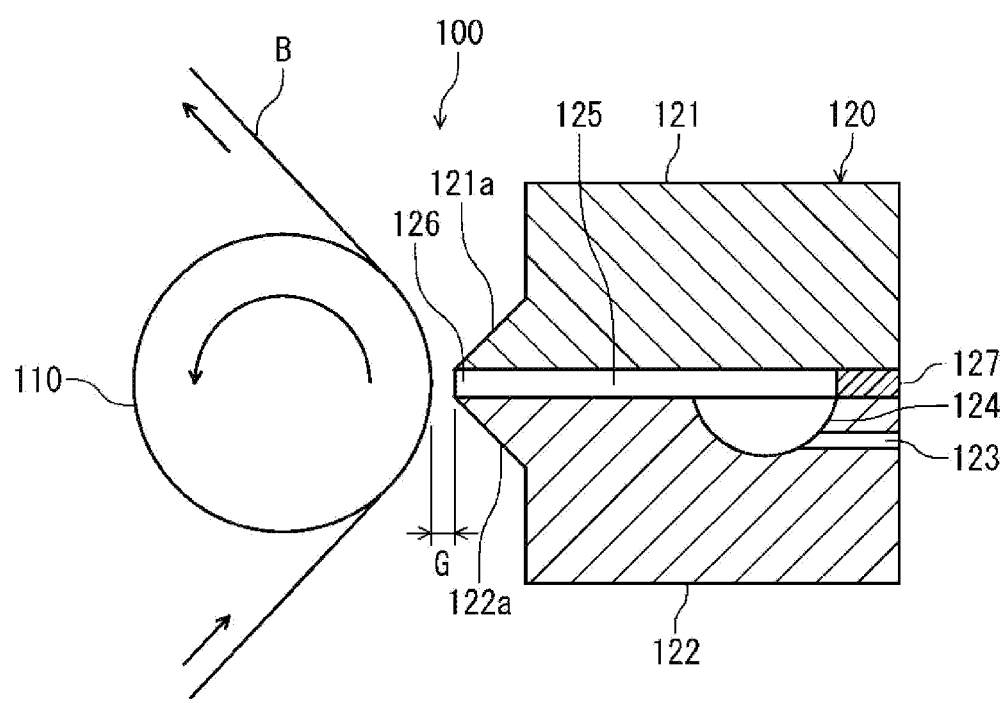
FIG. 1 is a cross-sectional view schematically showing an example of an electrode mixture slurry coating device according to the present disclosure.

An embodiment of the electrode mixture slurry coating device according to the present disclosure will be described below by way of examples. However, the present disclosure is not limited to the examples described below. Although examples of specific numerical values and materials may be given in the following description, other numerical values and materials may be used as long as the effects of the present disclosure can be achieved.

(Electrode Mixture Slurry Coating Device)

The electrode mixture slurry coating device (hereinafter may be simply referred to as a coating device) according to the present disclosure includes a transport roller and a die head, and is generally called a die coater. Here, the transport roller refers to a transport roller disposed so as to be opposed to a discharge port of the die head in the die coater, and is also referred to as a backup roller. With a shearing force generated between the discharge port of the die head and the backup roller, an electrode mixture slurry is coated in the form of a film onto a band-shaped base material.

(Transport Roller)

The transport roller (backup roller) transports the band-shaped base material (e.g., a metal foil used as an electrode current collector) along the extension direction thereof. The transport roller may be a columnar or cylindrical roller. The rotation axis of the transport roller may extend orthogonal to the extension direction of the base material. The transport roller may rotate at a substantially constant rotational speed, in which case the base material is transported at a substantially constant speed. The axial length of the transport roller may be longer than the longitudinal length of the die head.

(Die Head)

The die head is provided at a position opposed to the transport roller, and discharges and applies an electrode mixture slurry to the base material being transported. The die head includes a fluid reservoir, a discharge port, and a fluid path. The fluid reservoir is a portion in which the electrode mixture slurry accumulates. The discharge port is a portion from which the electrode mixture slurry is discharged toward the base material. The fluid path is a path that provides communication between the fluid reservoir and the discharge port, and through which the electrode mixture slurry flows.

The die head may include an inflow path that is open to the outside and is in communication with the fluid reservoir. Through the inflow path, the electrode mixture slurry may be supplied to the fluid reservoir from a slurry supply portion provided separately from the die head.

The uniformity of the application thickness of the electrode mixture slurry formed on the surface of the base material significantly affects the yield in production of secondary batteries. If the application thickness of the electrode mixture slurry varies, it may be difficult to accommodate the produced electrode group in a battery case, or may be unable to achieve the required high capacity. As the capacities of secondary batteries are even more increased, the allowable manufacturing tolerance is reduced, which results in an increase in the importance in ensuring the uniformity of the application thickness of an electrode mixture slurry.

In this respect, the uniformity of the application thickness of an electrode mixture slurry can be increased by controlling the coefficient of linear expansion of the constituent material of the die head. Specifically, a portion, being adjacent to the fluid path, of the die head is formed of a first material having a coefficient of linear expansion of 4.0 ppm/K or less. Accordingly, it is possible to suppress the thermal expansion of the die head caused by the heat of the electrode mixture slurry, and hence the variation in the gap length (i.e., the application thickness of the slurry) between the discharge port of the die head and the base material. Since the application thickness of the electrode mixture slurry is stabilized, the yield in manufacture of secondary batteries is improved.

Furthermore, $y<2000/\sqrt{x}$ holds where x [ppm/K] is the coefficient of linear expansion of the first material, and y [mm] is the length of the discharge port in the longitudinal direction of the die head. Accordingly, even when the length of the discharge port is relatively long, it is possible to suppress the variation in the application thickness of the electrode mixture slurry, thus improving the yield in manufacture of secondary batteries. The length y of the discharge port may be 1000 mm or more, 1200 mm or more, or 1300 mm or more.

The temperature of the die head tend to be higher in the vicinity of the center in the longitudinal direction thereof than the temperatures at both ends in the longitudinal direction thereof. The temperature of the die head can be made uniform through heat diffusion inside the die head when the length of the die head in the longitudinal direction is relatively short. However, a temperature difference tends to occur between the vicinity of the center and the vicinity of both ends in the longitudinal direction when the length of the discharge port of the die head is relatively long. For this reason, when the die head is formed of a material having a large coefficient of thermal expansion, and a temperature difference has occurred inside the die head, the degree of deformation caused by thermal expansion differs between the vicinity of the center and the vicinity of both ends of the die head in the longitudinal direction. When the thermal expansion in the vicinity of the center of the die head in the longitudinal direction becomes larger, the application gap in the vicinity of the center becomes smaller than the application gap in the vicinity of both ends, resulting in variation in the application gap in the longitudinal direction of the die head.

In this respect, the inventors of the present application have found that, when the coefficient of linear expansion x [ppm/K] of the first material and the lengthy [mm] of the discharge port in the longitudinal direction of the die head satisfy the relationship $y<2000/\sqrt{x}$, the variation in the application gap of the die head in the longitudinal direction can be suppressed even in the case where the discharge port of the die head is relatively long. Here, the case where the discharge port of the die head is relatively long refers to a case where the lengthy of the discharge port is 1000 mm or more, 1200 mm or more, or 1300 mm or more, for example.

As described above, according to the present disclosure, it is possible to improve the yield in manufacture of secondary batteries. Furthermore, according to the present disclosure, it is possible to improve the productivity of secondary batteries.

At least a portion, being adjacent to the discharge port, of the die head may be covered with DLC (diamond-like carbon). This can prevent the die head from wearing out in the vicinity of the discharge port, thus increasing the life of the die head.

Preferably, the electrode mixture slurry coating device is used as a coating device of a positive electrode mixture slurry containing a lithium-containing transition metal oxide. In this case, a lithium-containing transition metal oxide, which has a high degree of hardness, is present, and therefore the temperature of the die head tends to fluctuate according to the frictional heat. In addition, the positive electrode mixture slurry has a higher heat capacity than the negative electrode mixture slurry, and therefore more significantly affects the temperature of the die head. In these respects, at least a portion, being adjacent to the fluid path, of the die head according to the present disclosure is formed of the first material, and the die head is therefore less likely to be affected by the thermal expansion caused by a temperature change. Accordingly, it is possible to prevent a reduction in the yield in manufacture of secondary batteries. Note that a difference between the heat capacity of the positive electrode mixture slurry and the heat capacity of the negative electrode mixture slurry occurs owing to the differences in physical properties between particulate materials such as active materials and solvents contained in the respective slurries.

It is possible that $y \geq 1000$. Even when the discharge port has a large length as in this case, the present disclosure makes it possible to prevent a reduction in the yield in manufacture of secondary batteries.

A portion, being adjacent to the portion formed of the first material, of the die head may be formed of a second material having a Young's modulus of 170 GPa or more. In general, a material having a small coefficient of linear expansion also has a small Young's modulus. When the Young's modulus of the first material that forms at least a portion, being adjacent to the fluid path, of the die head is too small, the first material may be deformed by the discharge pressure of the electrode mixture slurry passing through the fluid path, thus causing a variation in the application gap. Therefore, of at least the portion, being adjacent to the fluid path, of the die head, a portion adjacent to the portion formed of the first material is preferably formed of a second material having a Young's modulus of 170 GPa or more. With a structure sandwiching a portion formed of the first material between portions formed of the second material, it is possible to prevent the first material from being deformed by the discharge pressure of the electrode mixture slurry passing through the fluid path. Examples of the second material include stainless steels such as SUS 304, SUS 430, and S45C.

The die head may include a first component, a second component, and a shim sandwiched between the first component and the second component, and the shim may close a part of a longitudinal central portion of the discharge port.

With this configuration, the electrode mixture slurry is discharged only from a portion of the discharge port that is not closed by the shim. Accordingly, the electrode mixture slurry is coated in stripes onto an object to be coated. The shim may close the discharge port at one location only, or multiple locations. Note that as used herein, the term "longitudinal central portion of the discharge port" does not refer to a particular point (location) such as the center, but means a region of the discharge port except for both longitudinal end portions thereof.

The shim may be formed of a third material having a coefficient of linear expansion of 4.0 ppm/K or less. The third material may be the same material as the first material, or a material different therefrom.

In the following, an example of the electrode mixture slurry coating device according to the present disclosure will be described in detail with reference to the drawings. The above-described constituent elements can be applied to the constituent elements of the exemplary coating device described below. The constituent elements of the exemplary coating device described below can be changed based on the above description. The matters described below may be applied to the above-described embodiment. Of the constituent elements of the exemplary coating device described below, constituent elements that are not essential to the coating device according to the present disclosure may be omitted. Note that the drawings described below are schematic views, and do not accurately reflect the actual shapes and the actual numbers of components.

As shown in FIG. 1, an electrode mixture slurry coating device 100 includes a transport roller 110 and a die head 120.

The transport roller 110 transports a band-shaped base material B. The base material B may be a current collector of a secondary battery. The transport roller 110 may be a columnar or cylindrical roller. The rotation axis of the transport roller 110 may extend orthogonal to the extension direction of the base material B. The transport roller 110 may rotate at a substantially constant rotational speed. The axial length (length in a direction orthogonal to the plane of paper in FIG. 1) of the transport roller 110 may be longer than the longitudinal length (length orthogonal to the plane of paper in FIG. 1) of the die head 120.

The die head 120 is provided at a position opposed to the transport roller 110, and discharges and applies an electrode mixture slurry to the base material B being transported. The die head 120 includes a first component 121 constituting the upper half thereof, a second component 122 constituting the lower half thereof, and a shim 127 sandwiched between the first component 121 and the second component 122.

The electrode mixture slurry is prepared by mixing a dispersing medium with an electrode mixture. The electrode mixture contains an electrode active material as an essential component, and may contain optional components such as a binder and a conductive material. The dispersing medium is a liquid component in which the electrode mixture is dispersed.

An electrode active material is a material that exhibits an electrochemical capacity. For example, an electrode active material of a lithium ion secondary battery exhibits a capacity through a redox reaction involving intercalation (absorption) and deintercalation (desorption) of lithium ions. When an electrode to be manufactured is a negative electrode, a carbon material or the like can be used as a negative electrode active material. A graphite, a hardly graphitizable carbon, a graphitizable carbon, or the like can be used as the carbon material. When an electrode to be manufactured is a positive electrode, a lithium-containing transition metal oxide, an olivine-type phosphoric acid lithium, or the like can be used as a positive electrode active material. Although a rocksalt-type oxide having a layered structure can be used as the lithium-containing transition metal oxide, the lithium-containing transition metal oxide is no not particularly limited.

The electrode mixture slurry of the present embodiment contains a lithium-containing transition metal oxide. Among lithium-containing transition metal oxides, a material containing nickel (Ni) as a main component of the transition metal tends to vary the temperature of the die head 120 due to frictional heat. Accordingly, the coating device 100 described above is very useful as a coating device for an electrode mixture slurry containing a lithium-containing transition metal oxide containing nickel (Ni) as a main component of the transition metal. Here, the lithium-containing transition metal oxide containing Ni as a main component of the transition metal may refer to, for example, a lithium-containing transition metal oxide in which the Ni content in all the metals other than lithium is 50 mol % or more (or 70 mol % or more, and even 90 mol % or more).

The first component 121 is formed in a somewhat flat, rectangular parallelepiped shape. At least a portion, being adjacent to a fluid path 125, of the first component 121 is formed of a first material having a coefficient of linear expansion 4.0 ppm/K or less (e.g., an invar material having a coefficient of linear expansion of 0.5 to 1.5 ppm/K, and preferably 0.5 to 0.6 ppm/K). The first component 121 of the present embodiment is entirely formed of the first material. The lower surface of the first component 121 is substantially flat. A first protrusion 121a whose vertical length decreases toward the transport roller 110 is formed at a portion (a lower left portion in FIG. 1), being opposed to the transport roller 110, of the first component 121. The protruding end of the first protrusion 121a may be covered with DLC.

The second component 122 is formed in a somewhat flat, rectangular parallelepiped shape. At least a portion, being adjacent to the fluid path 125, of the second component 122 is formed of the first material. The second component 122 of the present embodiment is entirely formed of the first material. The upper surface of the second component 122 is substantially flat except for a fluid reservoir 124. A second protrusion 122a whose vertical length decreases toward the transport roller 110 is formed at a portion (an upper left portion in FIG. 1), being opposed to the transport roller 110, of the second component 122. The protruding end portion of the second protrusion 122a may be covered with DLC.

A recess serving as the fluid reservoir 124 is formed in an upper portion of the second component 122. The fluid reservoir 124 extends over substantially the entire second component 122 in the longitudinal direction. An inflow path 123 communicating with the fluid reservoir 124 from the outside is formed at a longitudinal central portion of the second component 122. An electrode mixture slurry may be supplied to the inflow path 123 from an external slurry supply portion.

A fluid path 125 is formed between the first component 121 and the second component 122 in a region on the transport roller 110 side (the left side in FIG. 1) relative to the fluid reservoir 124. The fluid path 125 is a path through which the electrode mixture slurry flows. Both longitudinal ends of the fluid path 125 are closed by the shim 127. An exit of the fluid path 125 that is provided so as to be opposed to the transport roller 110 serves as a discharge port 126. The electrode mixture slurry that has been supplied to the die head 120 flows through the inflow path 123, the fluid reservoir 124, the fluid path 125, and the discharge port 126 in this order, and is then applied to the surface of the base material B being transported by the transport roller 110.

The shim 127 is a plate-shaped member, also called an inner deckle. The shim 127 is sandwiched between the first component 121 and the second component 122. The thickness of the shim 127 is substantially equal to the flow path width of the fluid path 125. The longitudinal length of the shim 127 is substantially equal to the longitudinal length of the die head 120. The shim 127 has an opening corresponding to the fluid path 125 and the discharge port 126. The shim 127 closes both longitudinal end portions of the fluid path 125.

Since both longitudinal end portions of the fluid path 125 are closed by the shim 127, and the shim 127 has an opening corresponding to the fluid path 125 and the discharge port 126, this can also be expressed as follows: The discharge port 126 is an opening portion, and a non-opening portion that is closed by the shim 127 is disposed adjacent to the opening portion.

Here, a coating device used for stripe coating by which coated portions to which the electrode mixture slurry is applied and uncoated portions to which no electrode mixture slurry is applied are alternately provided in the longitudinal direction of the band-shaped base material B, can be realized, for example, by placing a shim 127 also at a longitudinal central portion of the discharge port 126. That is, for stripe coating, non-opening portions are provided not only at both longitudinal ends, being adjacent to the discharge port 126, of the die head 120, but also at a longitudinal central portion of the die head 120. The number of locations where the shim 127 is to be provided to realize stripe coating is not limited to one.

Here, the electrode mixture slurry is present in the opening portion, whereas no electrode mixture slurry is present in the non-opening portion due to the presence of the shim 127. Accordingly, in stripe coating, a temperature gradient attributed to the presence or absence of the electrode mixture slurry also develops at a longitudinal central portion of the die head 120. When the die head 120 used for stripe coating is formed of a material having a large coefficient of thermal expansion, and a temperature difference thus occurs inside the die head 120, the degree of deformation of the die head 120 due to thermal expansion also differs at a longitudinal central portion of the shim 127, depending on the presence or absence of the shim 127. Therefore, the deformation of the die head 120 due to thermal expansion at a longitudinal central portion of the die head 120 can also be suppressed when the first material that forms the die head 120 of the coating device 100 for performing such stripe coating has a coefficient of linear expansion of 4.0 ppm/K or less, and the coefficient of linear expansion x [ppm/K] of the first material and the length y [mm] of the discharge port 126 in the longitudinal direction of the die head 120 satisfy the relationship $y<2000/\sqrt{x}$.

Furthermore, in order to suppress the thermal effects of the slurry on the shim 127 for realizing stripe coating, it is preferable that the shim 127 is also formed of a material having a coefficient of thermal expansion of 4.0 ppm/K or less.

The length (the length in a direction orthogonal to the plane of paper in FIG. 1) of the die head 120 may be 1300 to 1500 mm.

Figure 2:
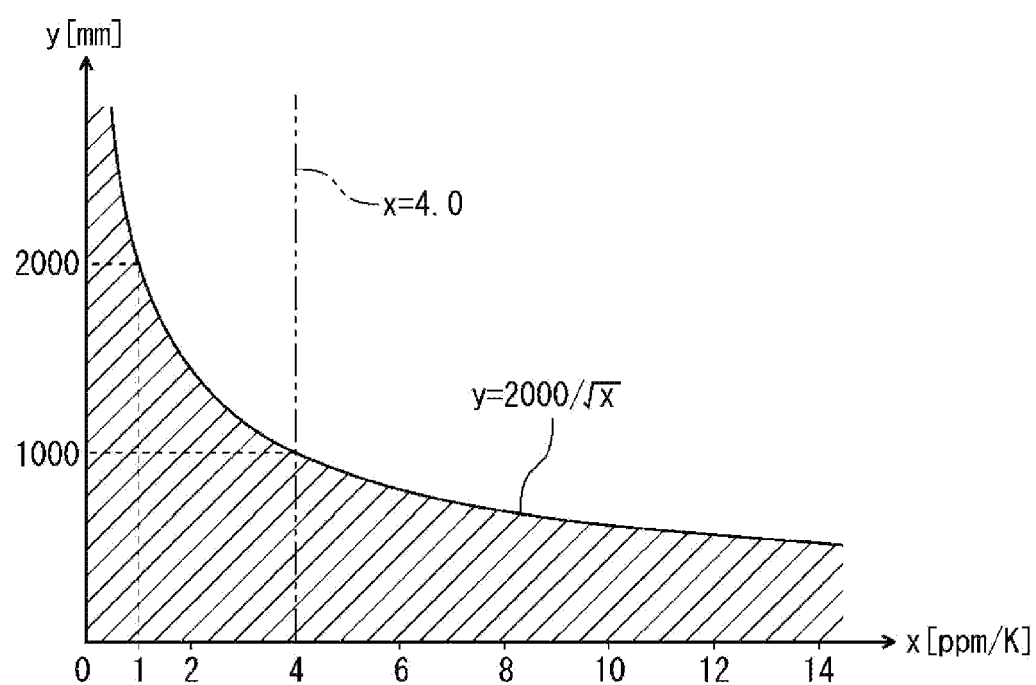
FIG. 2 is a graph plotting the coefficient of linear expansion of a constituent material of a die head on the horizontal axis, and the coating width on the vertical axis, the graph illustrating a range in which a gap fluctuation width has a value less than or equal to a permissible value.

FIG. 2 is a graph plotting the coefficient of linear expansion [ppm/K] of a constituent material of the die head 120 (specifically, the first component 121 and the second component 122) on the horizontal axis, and the coating width [mm] (i.e., the length of the discharge port 126 in the longitudinal direction of the die head 120) on the vertical axis. On this graph, the hatching indicates a range in which the fluctuation width of the application gap G (hereinafter simply referred to as a gap G) between the discharge port 126 and the transport roller 110 has a value less than or equal to a permissible value.

Here, the fluctuation width of the gap G refers to a difference between a minimum value (typically, a value at a longitudinal center of the die head 120) of the gap G and a maximum value (typically, a value at both longitudinal ends of the die head 120) of the gap G when the die head 120 has thermally expanded. The permissible value refers to a maximum value of the fluctuation width of the gap G that is allowed when the coating device 100 is used for manufacture of an electrode (typically, a positive electrode) of a secondary battery.

The curve shown in FIG. 2 was obtained through a numerical simulation under the following conditions. The initial value of the gap G between the die head 120 and the transport roller 110 was 150 μm, the temperature increase width (i.e., the temperature increase width of the die head 120) of the electrode mixture slurry was 7° C., and the permissible value of the fluctuation width of the gap G was 2%. Note that the expression "the permissible value of the fluctuation width of the gap G was 2%" means that the maximum value of the gap G was 102 with respect to the minimum value of the gap G when the die head 120 has thermally expanded, taken as 100 (reference).

The curve shown in FIG. 2 can be given when $y=2000/\sqrt{x}$, where x [ppm/K] is the coefficient of linear expansion of the constituent material of the die head 120, and y [mm] is the coating width. Also, the fluctuation width of the gap G can be suppressed to a permissible value or less in the region (hatched region) below the curve. As can be seen from FIG. 2, the absolute value of the gradient of the curve significantly increases in a region where the coefficient of linear expansion is smaller than x=4.0 ppm/K, which constitutes a border. That is, by forming the die head 120 using a material having a coefficient of linear expansion of 4.0 ppm/K or less, it is possible to manufacture an electrode of a secondary battery with a wider coating width, while suppressing the fluctuation width of the gap G to a permissible value or less.

INDUSTRIAL APPLICABILITY

The present disclosure is applicable to an electrode mixture slurry coating device.

REFERENCE SIGNS LIST

100 . . . . Coating device
110 . . . . Transport roller
120 . . . . Die head
121 . . . . First component
121a . . . . First protrusion
122 . . . . Second component
122a . . . . Second protrusion
123 . . . . Inflow path
124 . . . . Fluid reservoir
125 . . . . Fluid path
126 . . . . Discharge port
127 . . . . Shim
B . . . . Base material
G . . . . Application gap

The invention claimed is:

1. An electrode mixture slurry coating device comprising:
   a transport roller that transports a band-shaped base material; and
   a die head that is provided at a position opposed to the transport roller, and that discharges and applies an electrode mixture slurry to the base material being transported,
   wherein the die head includes a fluid reservoir in which the electrode mixture slurry accumulates, a discharge port for discharging the electrode mixture slurry, and a fluid path that provides communication between the fluid reservoir and the discharge port,
   at least a portion, being adjacent to the fluid path, of the die head is formed of a first material having a coefficient of linear expansion of 0.5 to 0.6 ppm/K, and
   $y < 2000/\sqrt{x}$ holds,
   where $x$ [ppm/K] is the coefficient of linear expansion of the first material, and $y$ [mm] is a length of the discharge port in a longitudinal direction of the die head.

2. The electrode mixture slurry coating device according to claim 1,
   wherein at least a portion, being adjacent to the discharge port, of the die head is covered with diamond-like carbon (DLC).

3. The electrode mixture slurry coating device according to claim 1,
   wherein the electrode mixture slurry contains a lithium-containing transition metal oxide.

4. The electrode mixture slurry coating device according to claim 1,
   wherein $y \geq 1000$.

5. The electrode mixture slurry coating device according to claim 1,
   wherein a portion, being adjacent to the portion formed of the first material, of the die head is formed of a second material having a Young's modulus of 170 GPa or more.

6. The electrode mixture slurry coating device according to claim 1,
   wherein the die head includes a first component, a second component, and a shim sandwiched between the first component and the second component, and
   the shim closes a part of a longitudinal central portion of the discharge port.

7. The electrode mixture slurry coating device according to claim 6,
   wherein the shim is formed of a third material having a coefficient of linear expansion of 4.0 ppm/K or less.

* * * * *